F. J. TILLMAN.
CALCULATING ATTACHMENT FOR TYPE WRITING MACHINES.
APPLICATION FILED MAR. 1, 1909.

933,600.

Patented Sept. 7, 1909.
10 SHEETS—SHEET 1.

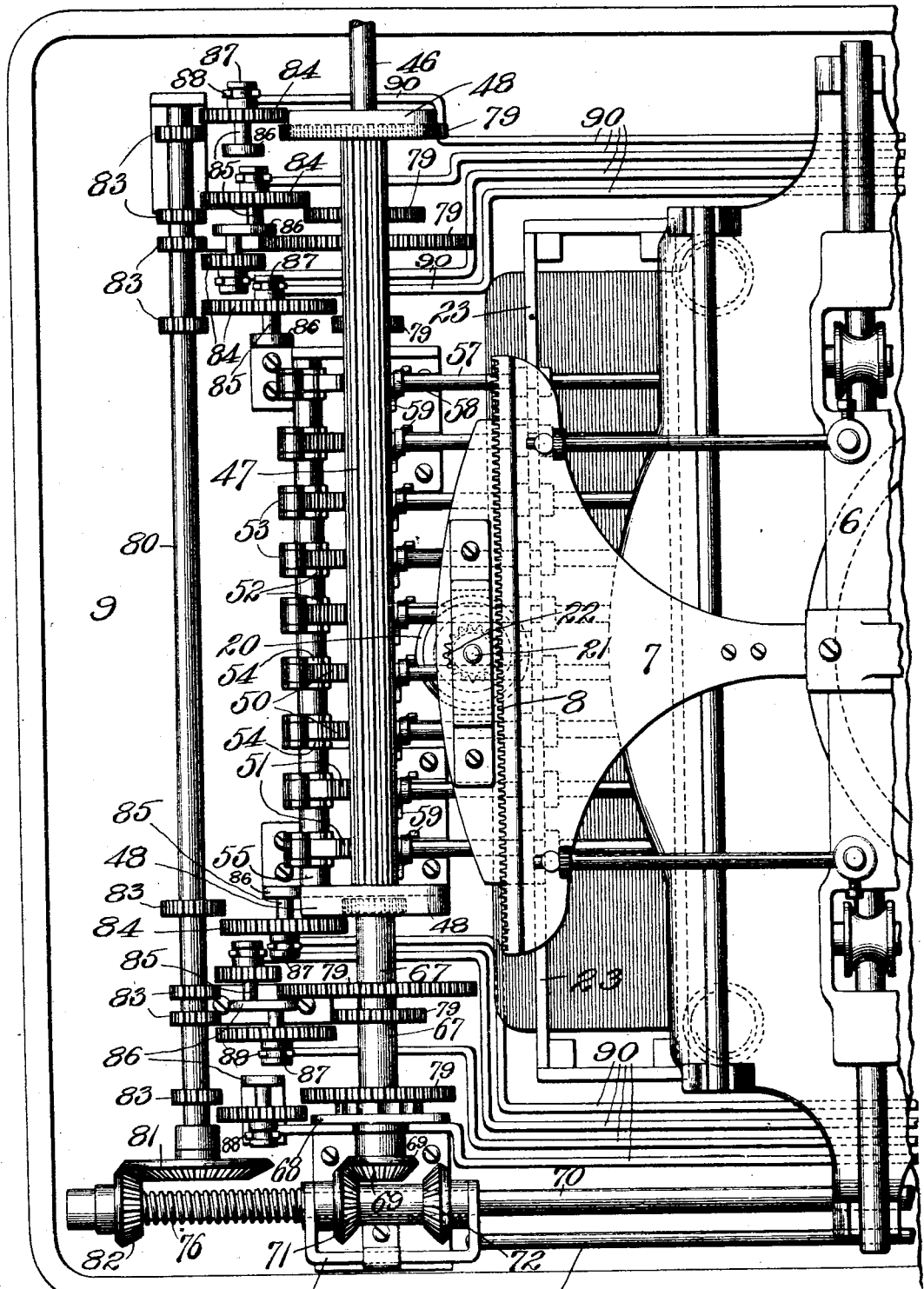

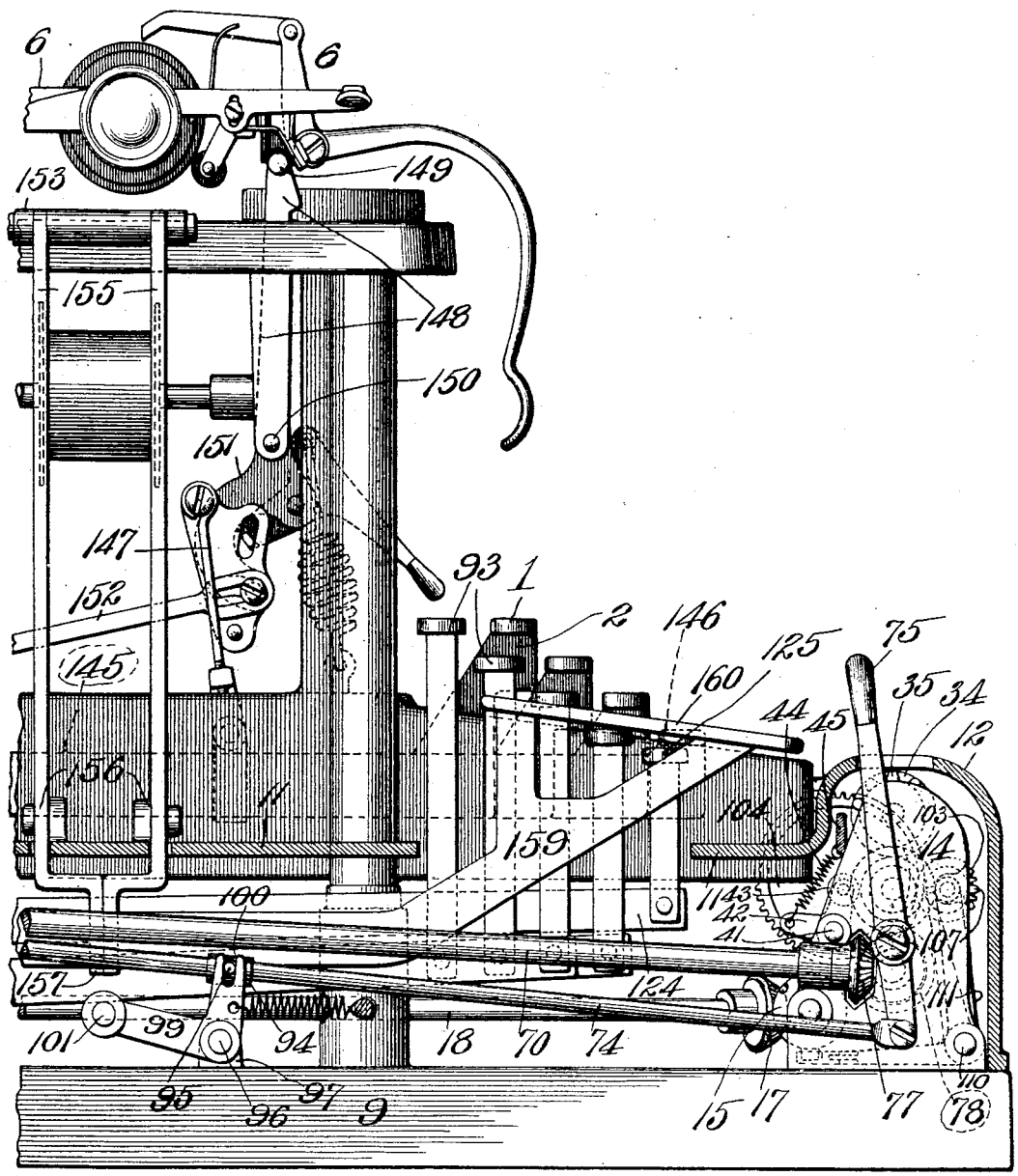

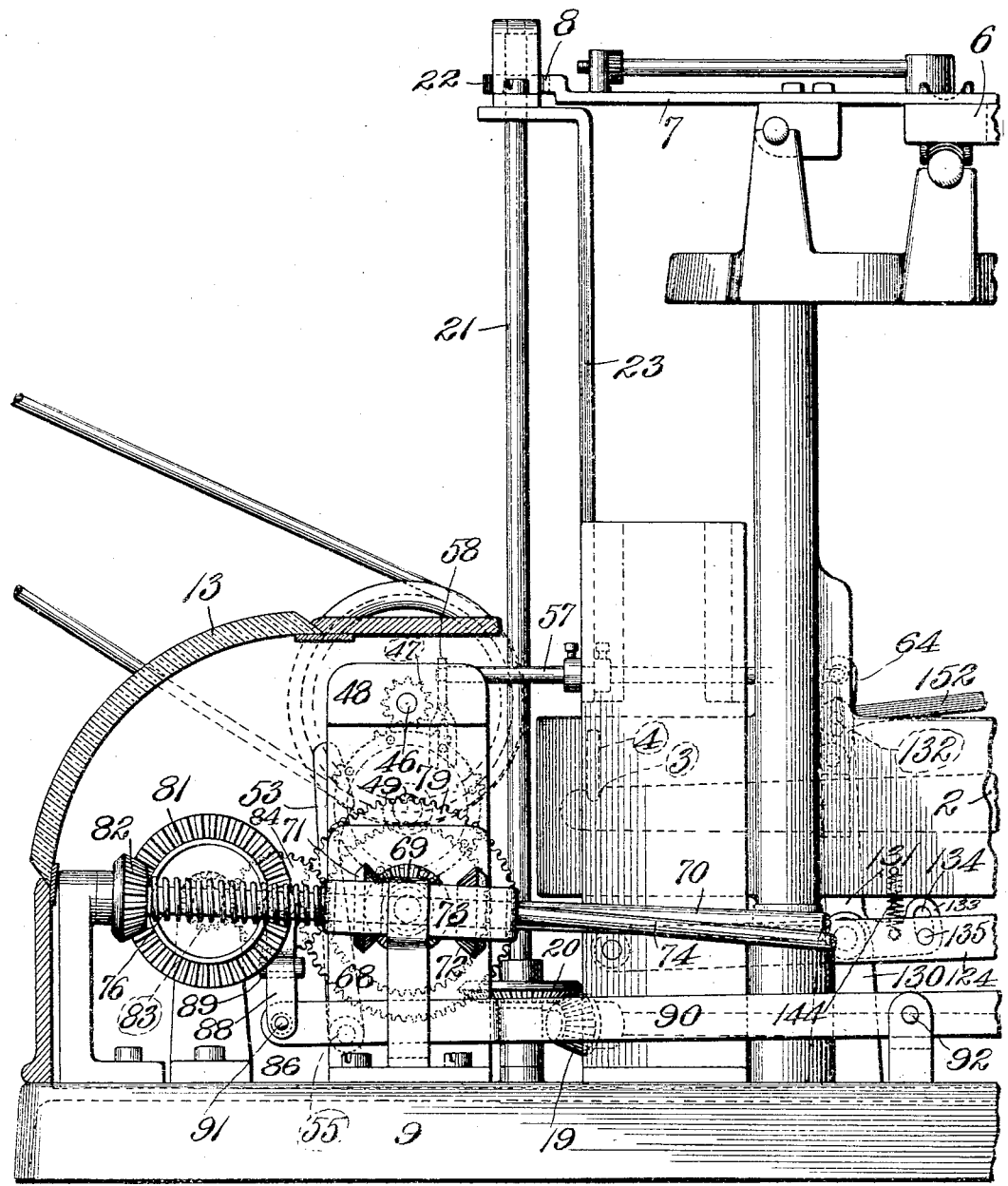

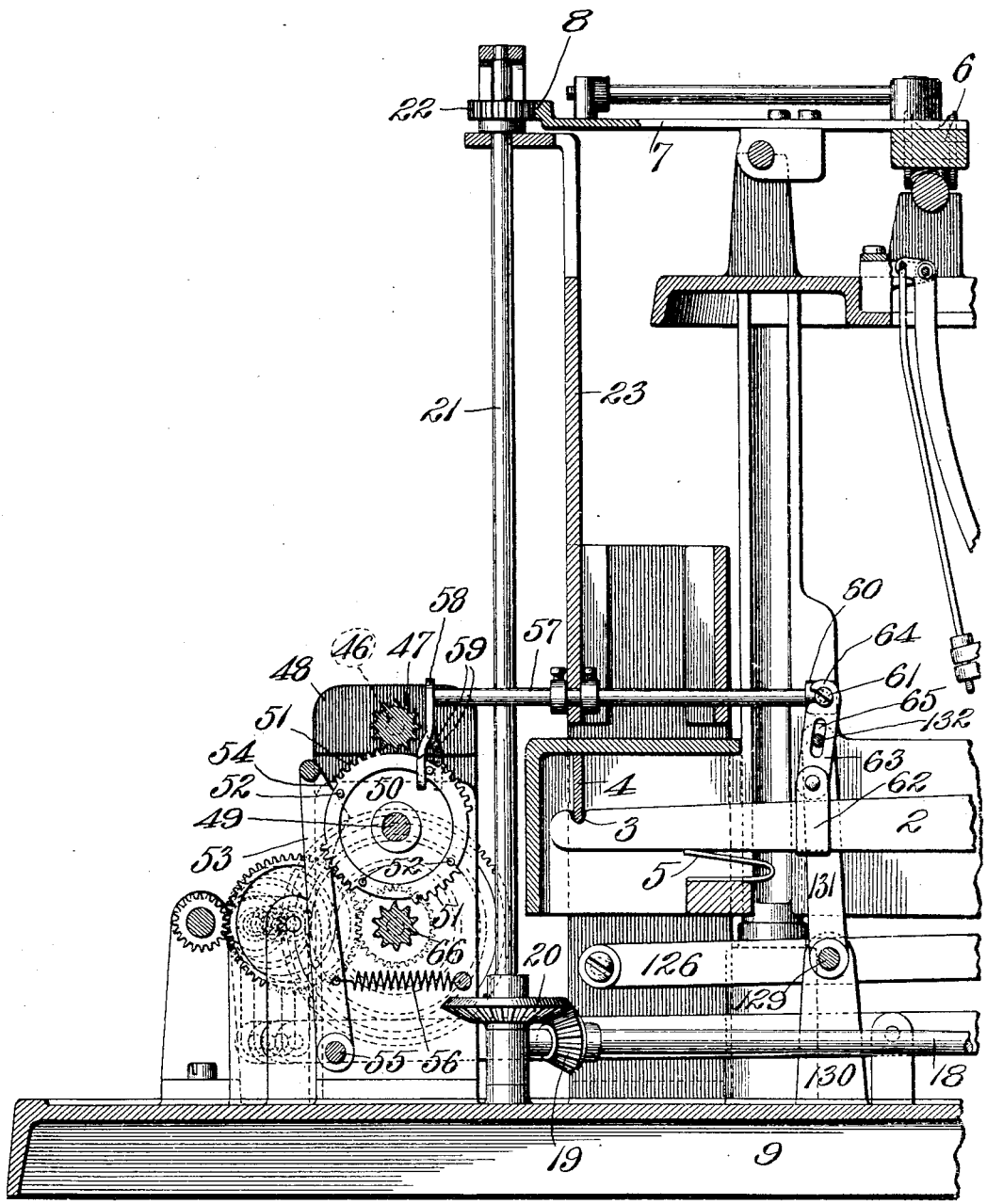

F. J. TILLMAN.
CALCULATING ATTACHMENT FOR TYPE WRITING MACHINES.
APPLICATION FILED MAR. 1, 1909.
933,600.
Patented Sept. 7, 1909.
10 SHEETS—SHEET 7.
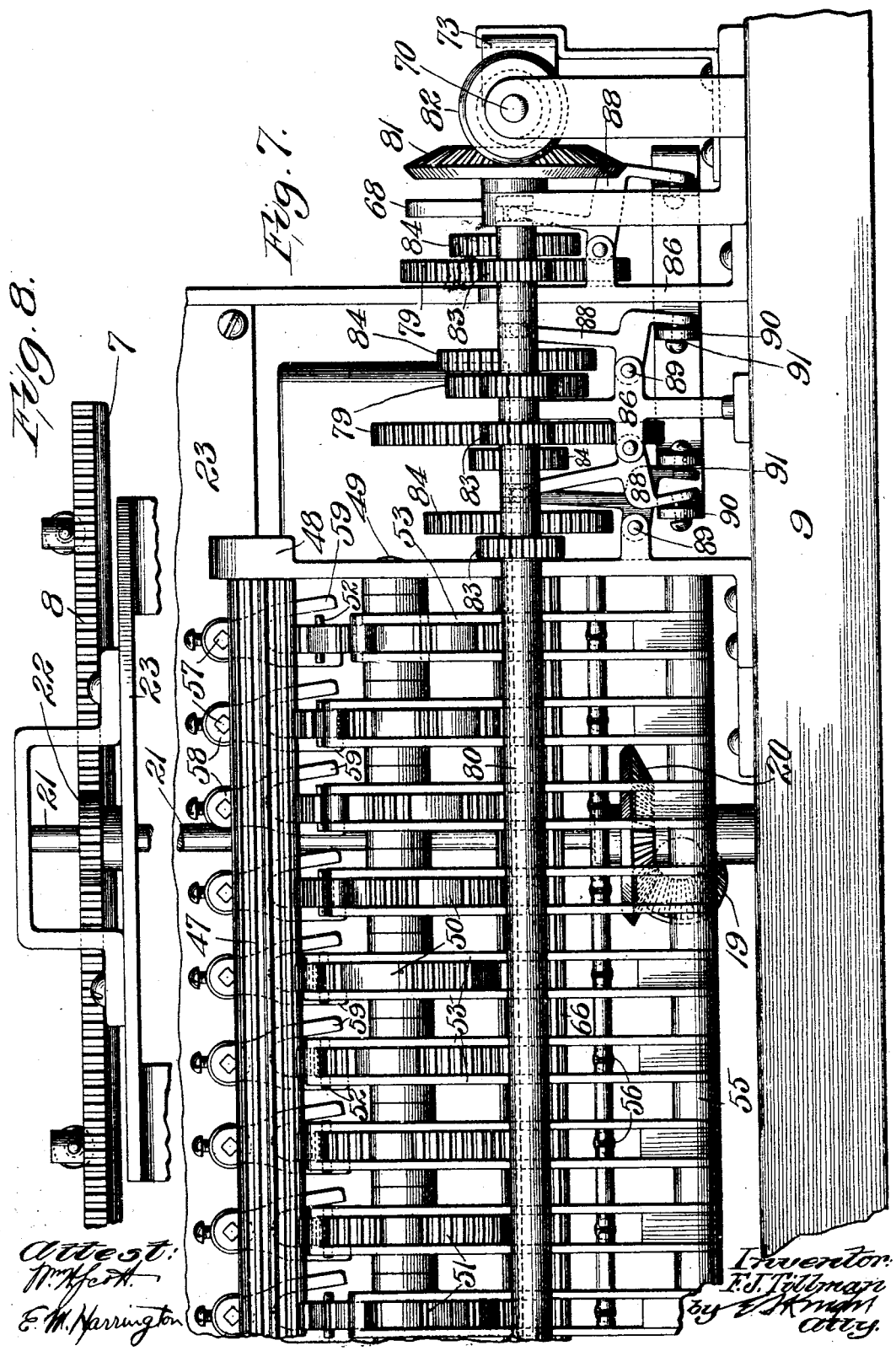

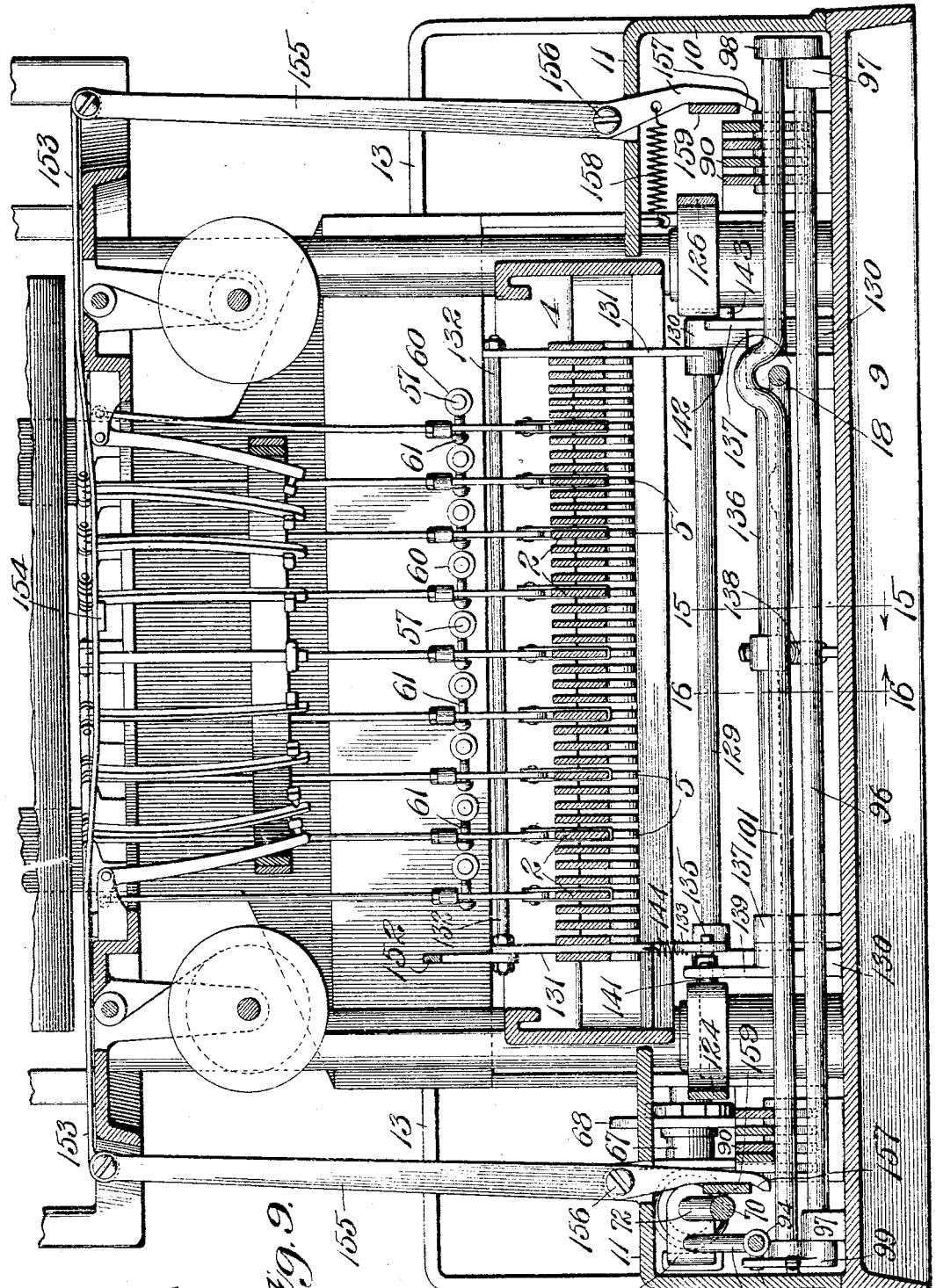

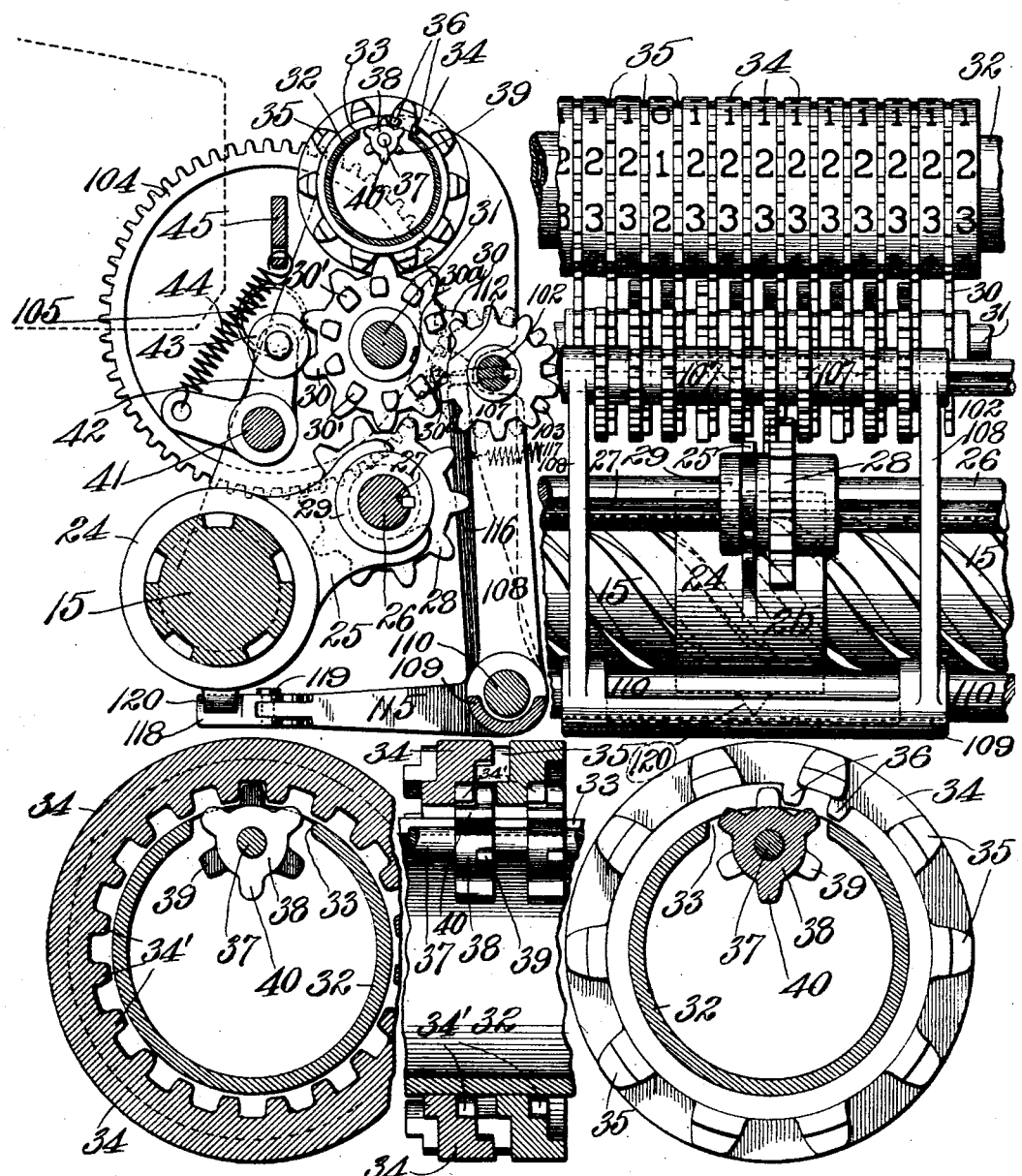
F. J. TILLMAN.
CALCULATING ATTACHMENT FOR TYPE WRITING MACHINES.
APPLICATION FILED MAR. 1, 1909.
933,600.
Patented Sept. 7, 1909.
10 SHEETS—SHEET 9.

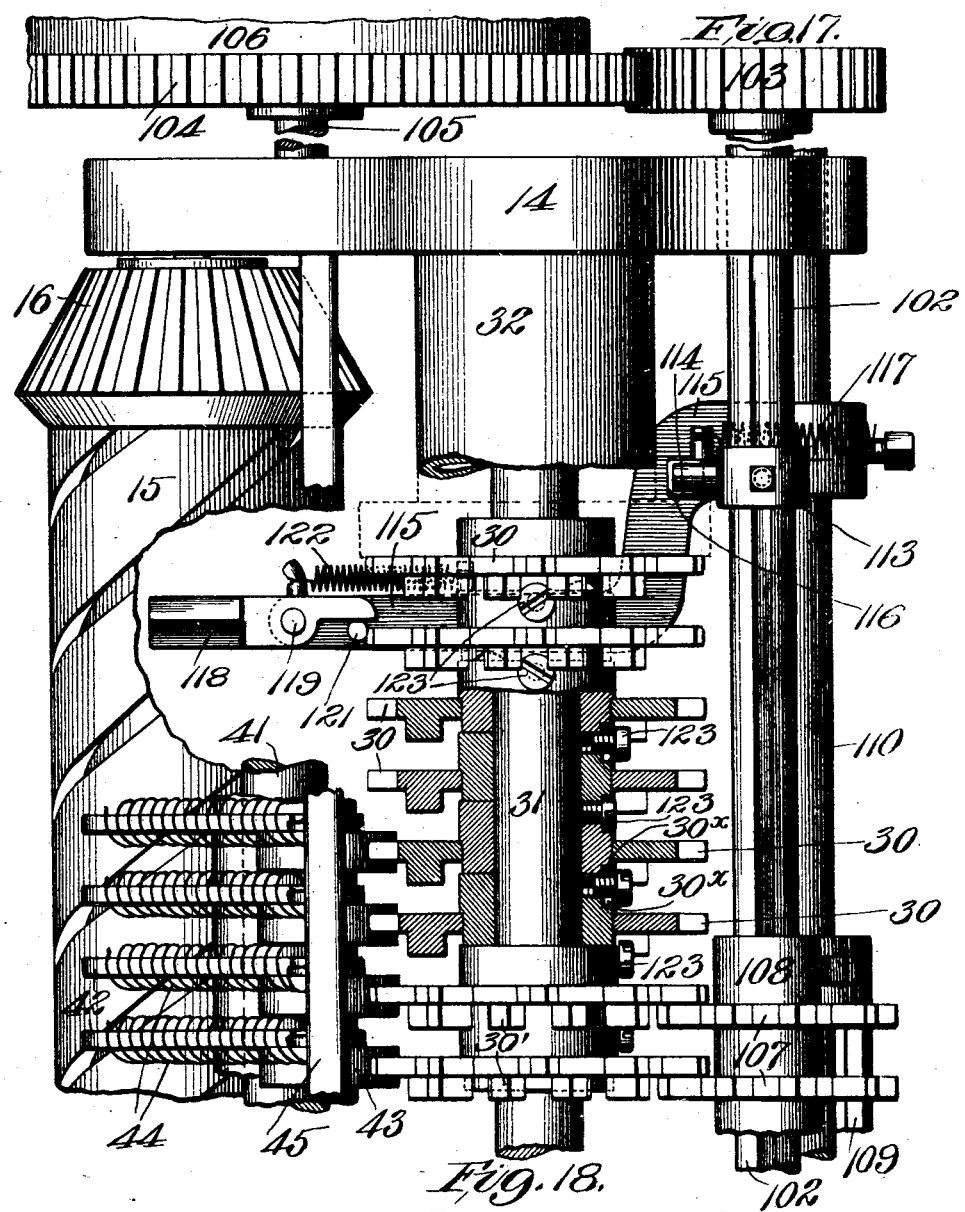
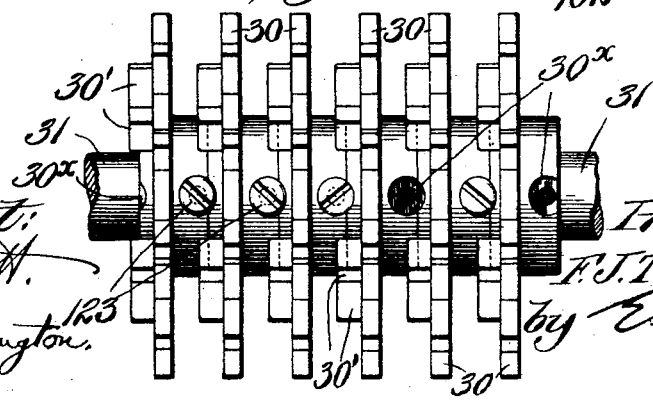

UNITED STATES PATENT OFFICE.

FERDINAND J. TILLMAN, OF ST. LOUIS, MISSOURI.

CALCULATING ATTACHMENT FOR TYPE-WRITING MACHINES.

933,600.  Specification of Letters Patent.  Patented Sept. 7, 1909.

Application filed March 1, 1909. Serial No. 480,749.

*To all whom it may concern:*

Be it known that I, FERDINAND J. TILLMAN, a citizen of the United States of America, residing in the city of St. Louis and State of Missouri, have invented certain new and useful Improvements in Calculating Attachments for Type-Writing Machines, of which the following is a full, clear, and exact description, reference being had to the accompanying drawings, forming part of this specification.

My invention relates to a calculating attachment for use with a typewriting machine of any ordinary construction in which a platen carriage is present and which is adapted to be operated through the medium of the typewriting machine key levers, platen carriage, and certain operating parts in the attachment aside from the typewriting machine.

The object of the invention is to provide a calculating attachment that is in the main coöperable with a typewriting machine, and whereby the key lever mechanism of the typewriting machine is serviceable for the control of the calculating mechanism.

Figure 1:
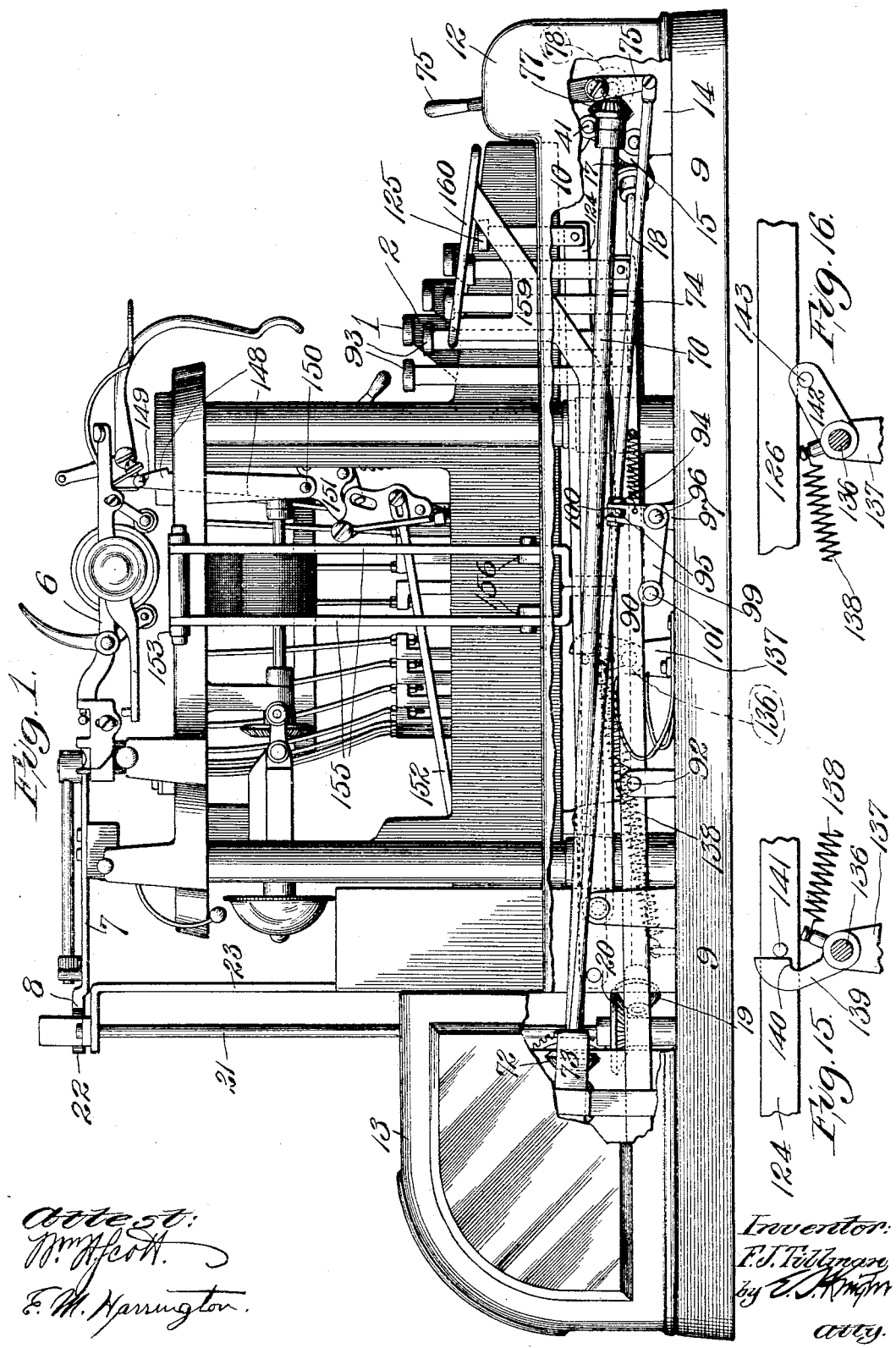
Figure 2:
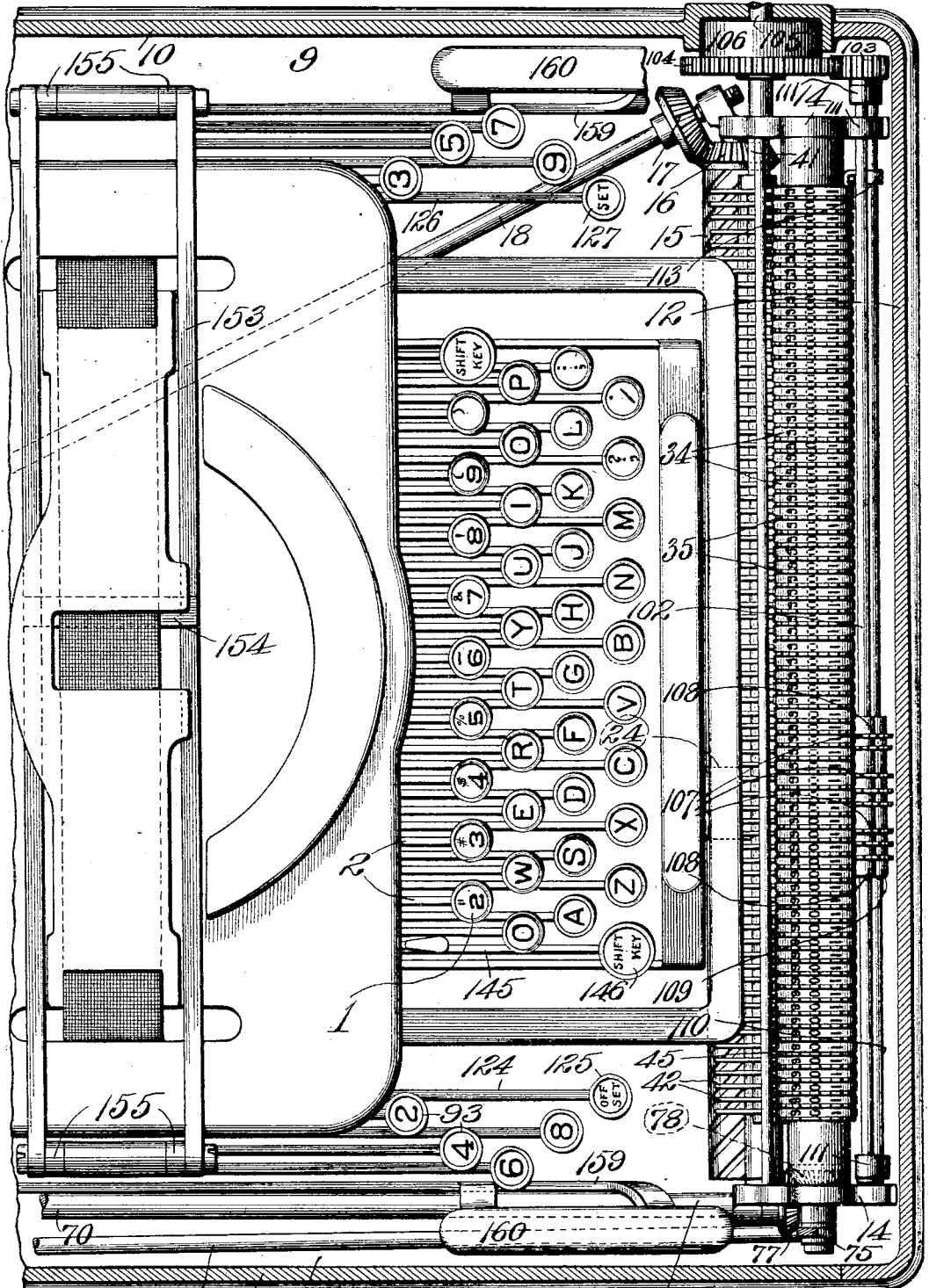

Figure 1 is a side elevation of my attachment and the typewriting machine associated therewith, the casing of the attachment being partly broken away. Fig. 2 is an enlarged top or plan view of the forward portions of my attachment and the typewriting machine. Fig. 3 is a top or plan view of the rear portions of the attachment and the typewriting machine. Fig. 4 is an enlarged side elevation of the forward portions of the attachment and typewriting machine, the casing of the attachment being partly shown in vertical longitudinal section. Fig. 5 is an enlarged side elevation of the rear portions of the attachment and typewriting machine with the casing of the attachment shown partly in vertical longitudinal section. Fig. 6 is an enlarged vertical longitudinal section taken centrally through the rear portion of the attachment and the rear portion of the typewriting machine. Fig. 7 is an enlarged rear elevation of the attachment. Fig. 8 is an enlarged rear elevation of the rack associated with the typewriting machine carriage and the spacing member associated therewith. Fig. 9 is an enlarged vertical cross section through the attachment and typewriting machine. Fig. 10 is an enlarged cross section through the registering mechanism of my attachment. Fig. 11 is an enlarged fragmentary front elevation of the registering mechanism. Fig. 12 is an enlarged cross section through one of the numeral wheels of the registering mechanism and the numeral wheel support, with one of the transfer wheels shown in elevation. Fig. 13 is a longitudinal section through the numeral wheel support, two of the numeral wheels, and two of the transfer wheels. Fig. 14 is an enlarged cross section taken through the numeral wheel support alongside of one of the numeral wheels and through one of the transfer wheels. Fig. 15 is in part a vertical section on line 15—15, Fig. 9, and in part an elevation of a fragment of one of the set levers and the setting lever beneath it. Fig. 16 is in part a vertical section on line 16—16, Fig. 9, and in part an elevation of a fragment of one of the offset levers and the latch dog for engagement with said lever. Fig. 17 is an enlarged view partly in plan and partly in horizontal section of the registering mechanism illustrating means whereby the transmission wheels may be connected in pair. Fig. 18 is an elevation of the transmission wheels shown in Fig. 17.

In the accompanying drawings, the characters to be hereinafter used will indicate similar parts in the various views in which they appear.

*The typewriting machine.*—The typewriting machine with which I associate my attachment may be one of any ordinary type in which a platen carriage is employed, and inasmuch as my invention does not appertain to the construction of the typewriting machine that is to be used, except as to certain members in the machine that coöperate with the mechanism of my attachment, I will not describe the general construction of any typewriting machine, but confine myself in the following description to the details that are necessary for an understanding of the operation of the typewriting machine and my attachment in conjunction therewith. The typewriting machine contains the usual keyboard and key levers, the latter of which are connected to type bars in order that writing operations may be carried on. The keyboard also contains a full complement of numeral keys 1 carried by numeral key levers 2, (see Figs. 2, 6, and 9,) the rear ends of which are fulcrumed at 3, (see Fig. 6,) beneath a cross bar 4 and are supported by springs 5. Each numeral key lever has united to it a connecting rod that leads to a numeral type bar bearing a numeral type corresponding to the numeral on the key of a particular key bar.

6 is a platen carriage slidably mounted on guides such as those common to typewriting machines, this platen carriage being shown in Figs. 1 and 3 to 6, inclusive. The platen carriage is operated in a manner common to typewriters and is provided with ordinary escapement means whereby it will partake of a step by step movement during the operation of a typewriting machine.

7 is a rack plate fixed to the platen carriage and extending rearwardly therefrom, the rack plate provided at its rear edge with a rack 8 which extends transversely of the typewriting machine.

*The calculating attachment frame.*—This frame comprises a base 9 surmounted by side housings 10 that extend upwardly from the base and are provided with inwardly extending tops 11, a front housing 12 within which the registering mechanism of the attachment is located, a sight opening through which the numeral wheels of the registering mechanism may be viewed, and a rear housing 13 within which the main operating mechanism at the rear of the attachment is incased.

*The registering mechanism.*—This mechanism is located within the front housing 12 and is seen in Figs. 2, 4, and 10 to 14, inclusive.

14 designates posts in the registering mechanism and by which the members of said mechanism are supported.

15 is a feed shaft or cylinder of the registering mechanism, the shaft being spirally grooved from end to end, (as seen in Figs. 2, 10 and 11,) and being operable by the platen carriage 6 of the typewriting machine and its movement. This shaft is journaled in the post 14 and it is operated through the medium of the rack plate 7 carried by the platen carriage of the typewriting machine. Rigidly attached to the feed shaft 15, at one end, is a bevel pinion 16 that is arranged in mesh with a bevel pinion 17 upon a transmission shaft 18 which extends rearwardly from the end of the feed shaft to the rear end of the typewriting machine and has fixed to it at its rear end a bevel pinion 19, (see Figs. 1 and 5 to 7, inclusive.) The bevel pinion 19 is arranged in mesh with a bevel wheel 20 fixed to an upright transmission shaft 21 located centrally of the back of the typewriting machine and which carries near its upper end a pinion 22 arranged in mesh with the rack 8 of the rack plate 7. The shaft 21 is stepped into a suitable bearing at its lower end and its upper end passes loosely through a supporting standard 23 surmounting the rear portion of the base of the typewriting machine. During the movement of the platen carriage 6 and the rack plate 7, the rack 8 of said plate by coöperating with the pinion 22 causes rotation to be imparted to the upright transmission shaft 21 and through the gear specified to the horizontal transmission shaft 18 whereby the feed shaft 15 has rotation imparted to it.

24 designates a feed carriage loosely fitted to the feed shaft 15 and provided internally with a feather adapted to operate in the spiral groove in said feed shaft whereby upon rotation of the shaft, movement of the feed carriage longitudinally of the feed shaft is occasioned. The feed carriage is provided with a forwardly extending bifurcated arm 25, (see Figs. 10 and 11.)

26 is a transmission shaft journaled in the supporting posts 14 extending parallel with the feed shaft 15 and provided with a longitudinal groove 27.

28 is a main transmission wheel splined to the grooved transmission shaft 26 and which has a hub 29 to which the arm 25 of the feed carriage 24 is loosely fitted, thereby providing for the movement of said main transmission wheel longitudinally of the shaft 26. During the forward and backward movement of the feed carriage 24 upon the feed shaft 15 in correspondence with forward and backward movements of the platen carriage of the typewriting machine through the medium of which said feed shaft is actuated. The transmission shaft has rotation imparted to it by mechanism to be hereinafter described and for a purpose to be explained.

Located above the main transmission wheel 28 is a series of supplemental transmission wheels 30 loosely arranged upon a supporting rod 31 above the transmission shaft 26 and mounted in the posts 14, and with either of which supplemental transmission wheels the main transmission wheel is adapted to engage for the purpose of imparting individual rotation thereto. Above the supporting rod 31 and supplemental transmission wheels thereon is a cylindrical support 32 having its ends fitted to the posts 14 and which is provided with a longitudinal slot 33, (see Figs. 10 and 12 to 14, inclusive.)

34 are numeral wheels or rings loosely arranged around the cylinder 32 and provided at their peripheries with numerical characters from "1" to "9" and the "0" sign. These numeral rings correspond in number to the number of supplemental transmission wheels 30 with which they are rendered individually coöperable by being provided with gear teeth 35 that mesh with the teeth of the supplemental gear wheels. Provision is made for the transfer from each of the numeral wheels to the numeral wheel next adjacent thereto by the incorporation of the following parts: Upon the sides of the numeral wheels are transfer teeth 36 that by rotating with the wheel are brought upon each rotation thereof to the slot 33 in the wheel supporting cylinder 32. 37 is a shaft extending longitudinally through the cylinder 32 in juxtaposition to the slot 33. The shaft has loosely mounted upon it transfer pinions 38, each of which is provided at one side with a plurality of teeth 40 that mesh with teeth 34' interior of the numeral wheel surrounding that side of the transfer pinion whereby rotation may be imparted to said numeral wheel when the transfer pinion is rotated. At the opposite side of each transfer pinion are teeth 39 adapted to engage the transfer teeth 36 of the numeral wheel next to that with which the teeth 40 engage when said transfer teeth of the numeral wheel have completed a rotation and transfer is to be made to the numeral wheel of a next higher denomination in performing a calculation. As illustrated in the drawings, there are six of the teeth 39 and three of the teeth 40 upon each transfer wheel and there are twenty teeth 34' interior of each numeral wheel with which the transfer wheel teeth engage. It will therefore be seen that when the movement of either transfer wheel is occasioned by engagement between the numeral wheel transfer-teeth 36 and the transfer teeth 39, the numeral wheel to which transfer is made will be rotated the distance of two of its teeth 34' and a distance corresponding to the degree of separation between any two of the ten characters upon the numeral wheel, the number of characters being one-half of the number of teeth 34'.

To prevent the transfer mechanism associated with the numeral wheels from being actuated more than the proper degree I provide detents 42 loosely mounted on a shaft 41 and having rollers 43 that bear against the teeth of the supplemental transmission wheels 30, (see Fig. 10.) The rollers are held against the supplemental transmission wheels by springs 44.

*The power and key controlled mechanisms.*—This mechanism with which the registering mechanism previously described is coöperable is located at the rear and sides of the attachment within the side housings 10 and the back housings 13, (see Figs. 3 and 5 to 7, inclusive.)

46 designates a main operating shaft journaled in standards 48 and having between said standards an elongated toothed gear 47. This operating shaft extends transversely of my calculating attachment at the rear of the typewriting machine and is adapted to be rotated continuously from a suitable source of power during the use of my attachment.

49 designates a counting wheel supporting rod located beneath the elongated gear 47, (see Fig. 6.) 50 are counting wheels loosely mounted upon this supporting rod. The counting wheels 50 are provided at their peripheries with counting teeth 51 arranged to mesh with the teeth of the elongated gear 47 and an elongated gear 66. The teeth of the counting wheels are seen most clearly in Figs. 5, 6 and 7, and there are nine of the wheels corresponding to the numerals "1" to "9." Upon the numeral "1" counting wheel corresponding to the numeral "1" key lever of the typewriting machine, are counting teeth arranged singly, and upon the remaining counting wheels, corresponding to the other numeral key levers of the typewriting machine, are counting teeth arranged in groups containing two, three, four, five, six, seven, eight, and nine teeth which, when placed in mesh with the elongated operating gear 47, cause the counting wheels to be rotated a number of steps that correspond to the number of teeth in a group on the counting wheel. At the sides of each counting wheel are stop pins 52.

53 are push levers arranged in series back of the counting wheels and each of which is of double-armed construction, as seen in Fig. 7, in order that the levers may straddle the counting wheels. The arms of the push levers are provided at their forward faces with cams 54 adapted to engage the stop pins 52. The several push levers are loosely mounted upon a transverse rod 55, (see Fig. 6,) and they have connected to them draw springs 56 that are adapted to impart forward movement to the push levers for the purpose of causing the counting wheels to be rotated by action of the cams 54 against the stop pins 52 when the counting wheels are relieved of restraint by means to be next described.

57 designates rockable governor rods journaled in the standard 23 surmounting the rear portion of the base of the typewriting machine and extending longitudinally relative to my attachment and the typewriting machine. There are a number of these governor rods corresponding to the number of numeral key levers in the typewriting machine and to the number of counting wheels 50. Each governor rod has fixed to it at its rear end a detent 58 provided with depending arms 59 that straddle the counting wheel to which the governor rod corresponds and which arms are offset from each other longitudinally of the controller rod, as seen in Fig. 6, to provide for the alternate engagement of the arms with the stop pins 52. The arms 59 of each detent are sufficiently spaced apart from each other to permit of the stop pin at one side of the counting wheel escaping past the arm at that side when the detent is moved by the governor rod to carry the opposite arm toward the counting wheel. Each governor rod 57 has fixed to it at its forward end a collar 60, and each collar is provided with a laterally projecting stem 61.

The numeral key levers 2 of the type-writing machine are connected to the governor rods 57 for the purpose of providing for the impartation of a rocking motion to said governor rods during the operation of said numeral key levers. The connection between each key lever and the governor rod comprises a clip 62 attached to the numeral key lever and a hook bar 63 pivoted to said clip and having a hook 64 at its upper end in engagement with the stem 61 of the collar 60 fixed to the governor rod that corresponds to said numeral key lever. In each hook bar is a longitudinal slot 65 to which more particular reference will hereinafter be made. When either of the numeral key levers 2 is depressed, the connection between said key lever and the corresponding governor rod acts upon said governor rod to rotate it in one direction whereby the detent 58 is moved in one direction, and when the numeral key lever is released and ascends under the action of the lift spring 5, this governor rod and detent are rotated in the opposite direction. It should be here stated that when the numeral key levers are in their elevated positions, one of the depending arms 59 is located in front of one of a pair of stop pins 52, while the other depending arm is located back of the opposite stop pin as seen in Fig. 6. Now when the key lever is depressed and the governor rod is rotated in one direction, the arm that is in front of a stop pin is moved laterally to free said pin, the other pin being already in front of the opposite detent arm. Immediately upon this freeing of the stop pin taking place, the spring actuated lever 53 straddling the counting wheel acts to impart rotation to said counting wheel due to the engagement of its cams 54 with a pair of stop pins whereby the counting wheel has sufficient rotation imparted to it to move a counting tooth upon said counting wheel into mesh with the constantly rotating elongated gear 47, and another tooth upon the same wheel into mesh with the elongated gear 66. The gear just mentioned is thus permitted to operate the counting wheel to a degree governed by the number of counting teeth provided for such engagement at a single time and upon the gap between the counting being reached, the actuation of the counting wheel is discontinued. This discontinuance is rendered positive by one of the stop pins of the counting wheel moving into engagement with one of the arms 59 of the corresponding detent 58. Then when the numeral key lever is again depressed, said detent arm is released from the stop arm it has engaged and the corresponding push arm is permitted to rotate the counting wheel into mesh with the elongated operating gear 47, as in the first instance.

66 designates an elongated transmission gear located beneath the series of counting wheels 50 and with which counting teeth upon said wheels are adapted to mesh simultaneously with the mesh of counting teeth with the operating gear 47. The transmission gear 66 is carried by a shaft 67 mounted in the post 68, (see Fig. 3.) When any individual counting wheel has rotation imparted to it by engagement with the operating gear 47, a degree of rotation similar to that of the counting wheel teeth is imparted to the elongated transmission gear and its shaft 67. The shaft 67 has fixed to it a miter wheel 69.

70 designates a transmission shaft extending longitudinally of my calculating attachment and by which the registering mechanism at the front of the attachment is operated when the transmission shaft 67 is operated. The shaft 70 has splined to it a rear miter wheel 71 and a forward miter wheel 72 that are adapted to be placed at different times in mesh with the miter wheel 69 whereby said shaft may be rotated either in one direction or in the opposite direction. The miter wheels 71 and 72 are located within a yoke 73 that is slidably fitted to the transmission shaft 70 and is adapted to be moved forwardly or backwardly by a shift rod 74 that extends forwardly from the yoke to an operating lever 75. The yoke 73 is normally pressed forwardly by means of a spring 76 surrounding the shaft 70 to maintain the rear miter wheel in mesh with the miter wheel 69. Fixed to the forward end of the transmission shaft 70 is a miter wheel 77 that meshes with a miter wheel 78 fixed to the transmission shaft 26 of the registering mechanism and whereby said registering mechanism transmission shaft is rotated to operate the transmission wheel 28 thereon.

When counting action occurs by the rotation of a counting wheel 50 in the manner previously explained, this counting action is transmitted through the transmission shaft 67 with which the counting wheels coöperate, from said shaft to the transmission shaft 70, and then to the transmission shaft 26, and main transmission wheel 28 which operates the registering mechanism. If at this time the miter wheel 71 is in mesh with the miter wheel 67, the transmission shafts 70 and 26 are so rotated as to operate the numeral wheels 34 in a direction to perform addition, while if the miter wheel 72 is placed in mesh with the miter wheel 67, rotation of the numeral wheels will be the reverse of that first stated and subtraction instead of addition will be performed upon said wheels.

*The multiplying mechanism.*—79 designates main multiplying gear wheels fixed to the transmission shaft 67, there being, (as shown in the drawings,) eight of these wheels which are located for convenience in part at one side of the calculating attachment and in part at the opposite side of said attachment. The multiplying gear wheels 79 in the shaft 67 correspond to the integers 2, 3, 4, 5, 6, 7, 8 and 9 and each wheel is provided with peripheral teeth that are of the number given by the result of the multiplication of the corresponding integer by ten; that is to say, the multiplying wheel 79 corresponding to the integer 2 is provided with twenty teeth; the multiplying wheel corresponding to the integer 3, with thirty teeth, and so on. It should be here stated that the elongated gear 66 on the shaft 67 contains ten teeth.

80 is a carrier shaft arranged parallel with the transmission shaft 67 and having fixed thereto a bevel wheel 81 that is arranged in mesh with a bevel wheel 82 fixed to the transmission shaft 70 that leads to the registering mechanism of the attachment.

83 are supplemental multiplying wheels fixed to the carrier shaft 80 and located opposite to the main multiplying wheels 79.

84 are transmission wheels rotatably and slidably mounted upon stems 85 projecting from posts 86, (see Figs. 3 and 7.) These transmission wheels are of suitable diameters to permit of their being placed in mesh with the main multiplying gear 79 and a supplemental multiplying gear 83 opposite thereto in order that the rotation imparted to the gear wheel 79 with the transmission shaft 67 may be communicated to the opposite supplemental multiplying gear wheel and the carrier shaft 80 on which the latter is mounted. Each transmission wheel 84 is provided with a clutch hub 87, (see Fig. 3,) that is engaged by the forked upper end of a shift lever 88, (see Fig. 7.) The several shift levers are pivoted at 89 to the posts 86.

90 designates the multiplying levers, the rear ends of which are loosely connected at 91, (see Figs. 5 and 7,) to the shift levers 88 beneath the points of pivotal support of the shift levers. The multiplying levers extend forwardly from the shift levers and are pivotally supported at 92. And the multiplying levers are provided with numeral keys 93 that bear numerals, (see Fig. 2,) corresponding to the integers represented by the main multiplying wheels 79.

For the purpose of placing the attachment in condition for the performance of multiplication, I employ means adapted to be actuated by the multiplication key levers when they are depressed whereby the shift rod 74 is actuated to move the shifter yoke 73. As previously stated, said shifter yoke is normally held in a forward position by the spring 76 and it is necessary to place it in an intermediate position before performing multiplication in order that there shall be no engagement between the miter wheels 69, 71 and 72. The shift rod has fixed to it intermediate of its ends a collar 94 that is provided with a laterally projecting stem 95, (see Fig. 1.)

96 is a transverse rod, (see Figs. 1 and 9,) rockably mounted in posts 97 surmounting the base 9 and which extends across said base beneath the multiplying levers. This shaft has fixed to it at one end an arm 98 and fixed to it at the opposite end, or at the end beneath the shift rod 74, a spring controlled bell-crank lever 99 provided with a rearwardly extending arm and an upwardly extending arm, the latter of which has a fork 100 in which the stem of the collar 94 is loosely seated.

101 is a trip rod mounted in the rearwardly extending arm of the bell crank lever 99 and in the arm 98 at the opposite side of the attachment. This trip rod is normally in contact with the lower edges of the several multiplication levers 90 in front of their points of pivotal support and when either of the multiplication levers is depressed the trip rod is moved downwardly causing the rear arm of the bell crank lever 99 to partake of a similar movement and the upper arm to move rearwardly and exert a pushing action upon the stem of the collar 94 whereby the shift rod 74 is moved rearwardly to a sufficient degree to carry the shifter yoke 73 to an intermediate position so that there may be no opportunity for coöperation between the miter wheel 69 on the transmission shaft 67 and either of the miter wheels 71 and 72 on the transmission shaft 70.

In performing a calculation in multiplication, one of the numeral keys of the typewriting machine is depressed to release the counting wheel corresponding thereto in order that said counting wheel may be operated through the medium of the elongated gear 47 for operation of the gear 66 and shaft 67 for counting action in the same manner as that it partakes of in the performance of addition or subtraction. A multiplication key lever is depressed for the purpose of shifting the corresponding transmission wheel 84 through the medium of its shift lever into a position intermediate of the main multiplication wheel 79 corresponding to the lever and the corresponding supplemental multiplication wheel 83. The numeral upon either the numeral key of the typewriting machine or the numeral key of the multiplication lever may represent the multiplicand or multiplier. The operation that takes place in the performance of multiplication may best be explained by an example. Assuming that it is desired to multiply 4 by 5, the multiplication lever bearing the numeral 4 key is depressed whereby through the shifting of the corresponding shift lever 88 the proper transmission wheel 84 is placed in mesh with the main multiplying wheel 79 corresponding thereto. The numeral 4 multiplication wheel having forty teeth and the opposite carrier wheel having twenty teeth. The numeral 5 key lever of the typewriting machine is next depressed and as a consequence the counting wheel 50 is placed in operation in the same manner as that previously explained in performing addition. Inasmuch as there is a group of five teeth upon said counting wheel that is engaged by the driving gear 47 and another group of five teeth that engage the transmission gear 66 having ten teeth, said transmission gear and its shaft are rotated the distance of five teeth or five-tenths of a cycle. The main multiplication wheel 79 under consideration is also rotated five-tenths of a cycle and inasmuch as this has forty teeth the degree of its rotation with the transmission shaft 67 represents the sum of the multiplication of 4 by 5. This result is then transferred to the carrier shaft 80 by the coöperation of the intermeshing transmission wheel 84 and carrier wheel 83. The carrier wheels have been described as provided with twenty teeth and consequently when the numeral 4 multiplying wheel rotates the distance of twenty of its teeth, the carrier shaft 80 has one complete rotation imparted to it, and which represent the sum "20." This sum is then carried by the carrier shaft through the bevel wheels 81 and 82 fixed respectively to the carrier shaft and the transmission shaft 70 whereby said last named shaft has two complete rotations imparted to it to cause it to actuate the registering mechanism at the front of the attachment to the proper degree to indicate upon two of the numeral wheels 34 in such mechanism the sum of the calculation.

*The numeral wheel resetting mechanism.*—This mechanism is located in front of the registering mechanism and is illustrated in Figs. 2, 4, 10, 11 and 17.

102 designates a resetting wheel shaft extending transversely of my attachment in front of the supplemental transmission wheels 30. This shaft is provided at one end with a pinion 103 that is arranged in mesh with a driving gear 104 fixed to a shaft 105 that is operated by a spring motor 106, (see Fig. 2.) The tendency of the spring motor 106 is to drive the gear 104 and cause it to drive the pinion 103 and resetting wheel shaft 102 when said last named shaft is unrestrained by a controlling device to be hereinafter described.

107 designates resetting wheels splined to the resetting wheel shaft and adapted to be moved longitudinally thereon so that they may be placed in engagement with any of the supplemental transmission wheels 30 which engage the gear teeth of the numeral wheels 34. The resetting wheels are arranged between the upwardly extending arms 108 of a carriage 109 that is slidably fitted to a supporting rod 110, (see Figs. 10, 11 and 17,) and which has fixed to it, near its ends, arms 111, (see Fig. 2,) that support the resetting wheel shaft 102 and are actuated by suitable springs to normally hold the resetting wheels in proximity to the supplemental transmission wheels 30. Each resetting wheel 107 is a mutilated wheel and contains nine teeth, there being a gap 112, (see Fig. 10,) between two of the teeth that corresponds in degree to the distance between one of the teeth and the second tooth therefrom in the regular arrangement of the teeth aside from said gap. The teeth of the resetting wheels are adapted to be placed in engagement with teeth 30′ at the sides of the supplemental transmission wheels 30 and between two of which is a gap 30$^a$ corresponding in extent to the extent of the gaps 112 between the teeth of the resetting wheels. When any of the numeral wheels are to be reset, the carriage 109 is shifted along the supporting rod 110 until the resetting wheels are opposite the supplemental transmission wheels corresponding to the numeral wheels to be reset, and the carriage 109 is then moved rearwardly to place the resetting wheels into position to coöperate with the side teeth 30′ of the supplemental transmission wheels. At such times the gaps 30$^a$ in the transmission wheels are not opposite the resetting wheels as seen in Fig. 10, (this being the position of the transmission wheels when the numeral wheels are cleared.) The resetting wheel shaft may be at this time released in a manner to be presently explained and will be operated by the spring motor 106 whereby the resetting wheels that are opposite supplemental transmission wheels corresponding to numeral wheels in an uncleared condition will act upon said transmission wheels with the result of rotating them until the gaps in the resetting wheels and transmission wheels are opposite to each other when the wheels will become disengaged with the numeral wheels in cleared conditions, or in other words, with the "0" sign in view through the sight opening in the front housing 12.

The resetting wheel shaft 102 which is constantly subject to the power of the spring motor 106 is controlled by the following mechanism: 113 is a collar splined to the resetting wheel shaft and provided with a rearwardly extending stem 114, (see Fig. 17.) 115 is a controller arm rockably mounted upon the rod 110 and which extends rearwardly from said rod beneath the registering mechanism to a position beneath the feed shaft 15, as seen in Figs. 10 and 17. This arm is surmounted by a post 116 that is arranged in the path of travel of the stem 114 carried by the collar 113 and is adapted to be engaged by said stem. The arm is normally held in a horizontal position by a retracting spring 117 that also serves to elevate the arm after it has been depressed in a manner to be explained. 118 is a dog pivoted at 119 to the controller arm and which is provided with a V-shaped upper edge. This dog is arranged in the path of travel of a trip lug 120, (see full lines Fig. 10 and dotted lines Fig. 11,) carried by the feed sleeve 24 operable on the feed shaft 15. The dog is limited in movement in one direction by a stop pin 121, (see Fig. 17,) surmounting the controller arm so that it cannot move out of alinement with the controller arm in that direction, although it may move out of such alinement in the opposite direction and be returned to its normal position by a retracting spring 122.

During the use of my calculating attachment, the resetting mechanism just described is brought into operation in the manner to be now explained. The controller arm 115 may be set at any desired point upon the rod 110 so that the dog 118 carried thereby will, during the forward movement of the feed sleeve 24, be engaged by the trip lug 120 carried by said sleeve. When said trip lug passes over the dog 118, it acts to depress said dog and the controller arm 115, and in so doing lower the post 116 on said arm to a sufficient degree to permit downward movement of the stem 114 carried by the resetting wheel shaft 102. The resetting wheel shaft is at this time rotated under the influence of the spring motor 106, its rotation being permitted by the escape of the stem 114 from the post 116. As the resetting wheel shaft rotates, it operates the resetting wheels thereon and causes them to operate the supplemental transmission wheels 30 to a degree sufficient to reset the numeral wheels in the manner previously pointed out. Immediately after the trip lug of the feed sleeve has passed over the dog 118, the controller arm is elevated to its normal position by the resetting spring 117 whereby the post 116 is placed in the path of travel of the stem 114, and rotation of the resetting wheel shaft is stopped.

It is desirable to provide in the registering mechanism of my calculating attachment means whereby spaces may exist between the numeral wheels on which calculations are shown and which spaces take the place of decimal points. To provide for the production of such spaces between the numeral wheels on which the calculating operations are indicated on the numeral wheels, I furnish means whereby the supplemental transmission wheels 30 may be connected in pairs so that the supplemental transmission wheel that operates in conjunction with the numeral wheel at which the decimal point space should occur will have in coöperation therewith the next supplemental transmission wheel at its right hand side, and the numeral wheel above the right hand transmission wheel will partake of the same movement as that partaken of by the numeral wheel at the decimal point space, which latter numeral wheel may be obscured by any suitable device placed thereover to hide it. The means I employ to connect any two supplemental transmissions adjoining each other to provide the result described comprise headed screws 123, (see Figs. 17 and 18,) the shank of each screw being seated entirely in the hub of the supplemental transmission wheel with which it is associated. The hubs of the adjoining wheels are provided with registering recesses 30ˣ adapted to receive the heads of the screws whereby said heads act, when seated in the recesses, to connect two adjoining wheels and cause them to partake of uniform rotation when one of them is operated by the transmission wheel 28. When the supplemental transmission wheels are to operate independently of each other, the screws 123 are retracted so that their heads are withdrawn from the recesses 30ˣ.

*The "offset" and "set" key lever mechanism.*—For the purpose of providing for the use of a typewriting machine with which my calculating attachment is associated without the calculating attachment being in operation, I furnish "offset" and "set" key lever mechanism by which the calculating mechanism is thrown out of condition for coöperation with the numeral key levers of the typewriting machine. This mechanism is illustrated in Figs. 1, 2, 4, 5, 6, 9, 15, and 16.

124 is an "offset" key lever having a key 125 bearing the word "Offset," and 126 is a "set" key lever having a key 127 bearing the word "Set" see Fig. 2. The two levers just mentioned extend longitudinally of the calculating attachment and are pivotally supported at their rear ends.

129, (see Figs. 6 and 9,) is a rock shaft journaled in posts 130 and located beneath the forward ends of the controller rods 57 and the hook bars 63 for engagement with said controller rods. The rock shaft 129 has fixed to it a pair of levers 131 that are arranged alongside of the "offset" and "set" key levers, each lever having a vertical arm that extends to a point alongside of the outermost hook bar 63 at the side of the calculating attachment at which the lever is located.

132 is a cross rod mounted in the vertical arms of the bell crank levers and extending through the slot 65 in the hook bar 63.

The lever 131, alongside the "offset" key lever, has a horizontally and forwardly extending arm 133, provided with a vertical slot 134, that receives a stem 135 carried by the "offset" lever, this engagement between the said lever 131 and the key lever being illustrated in Figs. 5 and 9.

136 designates a rock shaft extending transversely above the base of my calculating attachment and journaled in posts 137, (see Fig. 9.) This rock shaft has connected to it a retracting spring 138 adapted to impart rotation in one direction to the shaft. 139 is a latch dog fixed to said rock shaft at its end located in proximity to the "offset" key lever 124 and which is provided with a hook 140, (see Fig. 15,) adapted to engage a stud 141, (see Figs. 9 and 15,) projecting from the "offset" key lever when said "offset" key lever is depressed and the rock shaft 136 is rotated by the retracting spring 138. The latch dog is located in front of the stud just mentioned and is moved in a rearward direction when the rock shaft is rotated by the spring to carry the hook of the dog over the stud 141. When the "offset" key lever is depressed, the stem 135 carried thereby acts to impart a downward movement to the forward arm 135 of the bell crank lever 131 alongside of said key lever, with the result of causing said bell crank lever to impart rotation to the rock shaft 129, and the vertical arms of both levers 131 are moved forwardly, whereby the cross rod 132 extending through the hook bars 63 is caused to withdraw all of the hook bars from engagement with the stems 61 carried by the governor rods 57. The numeral key levers 2 are, therefore, disconnected from said governor rods and the calculating attachment is thrown out of condition for coöperation with the numeral key levers of the typewriting machine. Upon the depression of the "offset" key lever to actuate the parts just referred to, the latch dog 139 moves into engagement with the stud 141 on the "offset" key lever and said "offset" key lever is, therefore, held depressed to maintain the disconnection between the numeral key levers and the controller rods 57.

The rock shaft 136 has fixed to it at its end nearest the "set" key lever 126 a trip arm 142, (see Figs. 9 and 16,) that is provided with a stem 143 located beneath the "set" key lever 126. When the connection means, including the hook bars 63, are to be returned to their normal positions so that said hook bars are again placed in engagement with the governor rod 57, the "set" key lever is depressed, and, due to its bearing upon the stem 143, it acts to depress the trip arm 142 whereby the rock shaft 136 is rotated in a direction to displace the latch dog 139 from engagement with the stud 141 of the "offset" key lever, thus permitting said "offset" key lever to rise to its normal position and discontinue its holding action upon the lever 131 associated therewith. Said bell crank lever, rock shaft to which it is fixed, and companion bell crank lever, is then moved rearwardly by a retracting spring 144, (see Fig. 6,) with the result of causing the cross rod 132 to return the hook bars 63 into engagement with the stems 64 of the governor rod 57, whereby said governor rods are again placed in positions for coöperation with the numeral key levers 2 of the typewriting machine.

*The shift key mechanism.*—This mechanism, which appears in Figs. 1, 2, 4, 5 and 9, is utilized for the purpose of disconnecting the calculating mechanism from the numeral key levers to the same extent as disconnection is made when the "offset" key lever 124 is depressed. The object in providing the shift key mechanism is to produce the disconnection specified and permit of the operation of the numeral key levers when the typewriting machine platen carriage is shifted and a character other than a numeral bearing type bar is to be utilized for printing action.

145 designates a shift key lever provided with a key 146. The shift key lever is pivotally mounted and spring supported.

148 is a frame that supports the guide rail 149 on which the platen carriage 6 of the typewriting machine operates and which frame is rockably supported upon a pivot rod 150. The frame 148 has conjoined to it a lever 151 by which the rail supporting frame 148 may be moved rearwardly to shift the platen carriage backwardly. The parts just described are common to typewriting machines at present in use and no invention *per se* is herein claimed for them.

147 designates a vertical pull rod that is connected at its lower end to the shift key lever 145, and at its upper end to the shift lever 151 associated with the rail supporting frame 148.

152 is a pull rod extending longitudinally of the typewriting machine and having slot and pin connection at its forward end with the frame 151, (see Figs. 1 and 4.) The rear end of this pull rod 152 is connected to the cross rod 132 that passes through the hook bars 63, (see Figs. 5 and 9.) When the shift key lever 145 is depressed, a downward pull upon the pull rod 147 is exerted, whereby the lever 151 is operated to move the shifting arm 148, and at the same time impart a forward movement to the pull rod 152. As a consequence of the forward movement of the pull rod 152, the cross rod 132 and the parts by which it is supported are moved forwardly, the hook bars 63 being, therefore, withdrawn from connection with the governor rods 57, with resulting disconnection between the numeral key bars 2 and the calculating mechanism. The shift key lever 145 is held depressed until the numeral key lever, or levers, to be operated for the purpose of printing with characters other than numerals on the numeral type bars has been carried out, and upon the release of the shift key lever, the parts that have been actuated due to its depression resume their normal positions.

It is sometimes desired in the use of my calculating attachment with a typewriting machine to prevent impressions by the numeral type in the machine upon paper that is being written upon, and I therefore provide a guard member located beneath the platen carriage of the typewriting machine and means for shifting this guard member into and out of the path of travel of the type upon the type bars when they are moved toward the platen carriage. This mechanism is shown in Figs. 1, 2, 4 and 9.

153 designates a frame extending transversely across the top of the typewriting machine beneath the platen carriage and to which is fixed, at a central location, a guard plate 154 located in such position as to be shifted by the frame 153 into a position to be struck by the type of the type bars when they are elevated toward the platen end of the platen carriage. The frame 153 has pivoted to it at its ends vertical throw levers 155 that are pivotally mounted at 156. Each throw lever is provided beneath its point of pivotal support with a cam leg 157, the cam face of one of the legs passing toward the center of the typewriting machine, and the cam face of the other leg passing away from the center of the machine. The two throw levers are, as will be seen, connected at their upper ends by the frame 153 so that the movement imparted to one of them will be communicated to the other and they are controlled in part by a retracting spring 158.

159 are key levers against which the cam legs of the throw levers rest and which are provided with keys 160. When the key lever 159 at either side of the typewriting machine is depressed, it acts by impingement against the throw lever leg 157 adjacent thereto to move the throw lever so that the frame 153 will be moved in a direction to carry the guard plate 154 into a position to be struck by the type of any type bar that may be elevated and said guard plate acts as a shield to prevent printing action by the type of the type bar at this time.

I claim:

1. The combination in a calculating machine, of a support, a counting wheel loosely mounted on said support and having a stop at a side thereof, counting wheel operating means, a rockable governor rod arranged transversely relative to the axis of said counting wheel and having a detent movable toward said counting wheel for engagement with the side stop carried thereby, registering mechanism operable by said counting wheel, and key lever mechanism for controlling said governor rod.

2. The combination in a calculating machine, of a support, a counting wheel loosely mounted on said support and having a stop at each of its sides, a rockable governor rod having a pair of detents straddling the counting wheel corresponding thereto for engagement with the side stops of the counting wheel, registering mechanism operable by said counting wheel, and key lever mechanism for controlling said governor rod.

3. The combination in a calculating machine, of a support, a counting wheel loosely mounted on said support and having a stop at each of its sides, a rockable governor rod having a pair of detents straddling the counting wheel for engagement with its side stops, the detents being offset from each other longitudinally of the governor rod, registering mechanism operable by said counting wheel, and key lever mechanism for controlling said governor rod.

4. The combination in a calculating machine, of a counting wheel having groups of teeth spaced apart from each other and representing an integer, means for engagement with the teeth in said groups to operate the counting wheel to a degree corresponding to the extent of each group of teeth, means for moving said counting wheel into engagement with its operating means, and registering mechanism operable by said counting wheel.

5. The combination in a calculating machine, of a counting wheel having groups of teeth spaced apart from each other and representing an integer, means for engagement with the teeth in said groups to operate the counting wheel to a degree corresponding to the extent of each group of teeth, governing means for detaining said counting wheel, means for moving said counting wheel into engagement with its operating means after it has been released by the actuation of said governing means, and registering mechanism operable by said counting wheel.

6. The combination in a calculating machine, of a support, a series of counting wheels loosely mounted on said support, each wheel having groups of teeth at the periphery thereof spaced apart from each other and representing an integer different from the integer represented by the groups of teeth on the other counting wheels, means for engagement with the teeth in said groups to operate either of the counting wheels to a degree corresponding to the extent of the group of teeth thereon, means for moving said counting wheel into engagement with its operating means, and registering mechanism operable by said counting wheel.

7. The combination in a calculating machine, of a support, a series of counting wheels loosely mounted on said support, each wheel having groups of teeth at the periphery thereof spaced apart from each other and representing an integer different from the integer represented by the groups of teeth on the other counting wheels, a single member for engagement with the teeth in said groups to operate either of the counting wheels to a degree corresponding to the extent of the group of teeth thereon, means for moving said counting wheel into engagement with said single operating member, and registering mechanism operable by said counting wheel.

8. The combination in a calculating machine, of counting wheels, a counting wheel operating member, registering mechanism, a registering mechanism operating member for engagement by said counting wheels, key lever actuated means for controlling said counting wheels, and means for individual actuation of said counting wheels to place them in engagement with said counting wheel operating member, and registering mechanism operating member.

9. The combination in a calculating machine, of counting wheels, a counting wheel operating member, a registering mechanism, a registering mechanism operating member for engagement by said counting wheels, key lever actuated means for controlling said counting wheels, and levers for individually engaging said counting wheels to move them into engagement with said counting wheel operating member and said registering mechanism operating member.

10. The combination in a calculating machine, of counting wheels, a counting wheel operating member, registering mechanism, a registering mechanism operating member for engagement by said counting wheels, and spring controlled levers for individually engaging said counting wheels to place them in engagement with said counting wheel operating member, and said registering mechanism operating member.

11. The combination in a calculating machine, of counting wheels, a counting wheel operating member, registering mechanism, a registering mechanism operating member for engagement by said counting wheels, key lever actuated means for controlling said counting wheels, and levers provided with cams for individual engagement with said counting wheels, to place them in engagement with said counting wheel operating member and said registering mechanism operating member.

12. The combination in a calculating machine, of counting wheels, a counting wheel operating member, registering mechanism, a registering mechanism operating member for engagement by said counting wheels, key lever actuated means for controlling said counting wheels, and spring controlled levers having cams for individual engagement with said counting wheels to place them in engagement with said counting wheel operating member and said registering mechanism operating member.

13. The combination in a calculating machine, of counting wheels, a counting wheel operating member, registering mechanism, a registering mechanism operating member for engagement by said counting wheels, pins carried by said counting wheels, and levers for individual engagement with the pins of said counting wheels to move the counting wheels into engagement with said counting wheel operating member and said registering mechanism operating member.

14. The combination in a calculating machine, of a support, counting wheels loosely mounted on said support, counting wheel operating means, a shaft operable by said counting wheels, a plurality of multiplying wheels fixed to said shaft and each having teeth different in number from the others and representing different integers, a registering mechanism, and means of connection between said shaft and registering mechanism.

15. The combination in a calculating machine, of a support, counting wheels loosely mounted on said support, counting wheel operating means, a shaft operable by said counting wheels, a plurality of multiplying wheels associated with said shaft and each having teeth different in number from the others and representing different integers, a second shaft, gear wheels on said second shaft, shiftable transmission wheels adapted to connect said multiplying wheels with the gear wheels on said second shaft, a registering mechanism, and means of connection between said second shaft and said registering mechanism.

16. The combination in a calculating machine, of a support, counting wheels loosely mounted on said support, counting wheel operating means, a shaft operable by said counting wheels, a plurality of multiplying wheels fixed to said shaft and each having teeth different in number from the others and representing different integers, a second shaft, gear wheels on said second shaft, shiftable transmission wheels adapted to connect said multiplying wheels with the gear wheels on said second shaft, a registering mechanism, and means of connection between said second shaft and said registering mechanism.

17. The combination in a calculating machine, of a plurality of counting wheels, a single operating member for engagement with either of said counting wheels, means for controlling said counting wheels individually, a single transmission member for engagement by either of said counting wheels, a registering mechanism, and means of connection between said transmission member and said registering mechanism.

18. The combination in a calculating machine, of a registering mechanism, having numeral wheels and transmission wheels and means for resetting said numeral wheels, comprising a shiftable resetting wheel for engagement with said transmission wheels, a rotatable support for said resetting wheels, and a motor for actuating said support.

19. The combination in a calculating machine, of a registering mechanism having numeral wheels and transmission wheels, of numeral wheel resetting means comprising a resetting wheel for engagement with said transmission wheels, a shaft on which said resetting wheel is mounted, means for rotating said shaft, a motor for operating said resetting wheel shaft, and tripable means for controlling said resetting wheel shaft.

20. In a calculating machine, the combination with a registering mechanism, having numeral wheels and transmission wheels, a feed shaft, a carriage operable on said feed shaft, and a driving wheel carried by said carriage for operating said transmission wheels, of numeral wheel resetting mechanism comprising a resetting wheel shaft, a resetting wheel on said shaft for engagement with said transmission wheels, a motor for operating said resetting wheel shaft, and means controlled by said carriage for controlling said resetting wheel shaft.

21. In a calculating machine, the combination with a registering mechanism, having numeral wheels and transmission wheels, a feed shaft, a carriage operable on said feed shaft, and a driving wheel carried by said carriage for operating said transmission wheels, of numeral wheel resetting mechanism comprising a resetting wheel shaft, a resetting wheel on said shaft for engagement with said transmission wheels, a motor for operating said resetting wheel shaft, and a controller arm arranged to be actuated by said carriage for controlling the rotation of said resetting wheel shaft.

22. In a calculating machine, the combination with a registering mechanism, having numeral wheels and transmission wheels, a feed shaft, a carriage operable on said feed shaft, and a driving wheel carried by said carriage operable on said feed shaft, and a driving wheel carried by said carriage for operating said transmission wheels, of numeral wheel resetting mechanism comprising a resetting wheel shaft, a resetting wheel on said shaft for engagement with said transmission wheels, a motor for operating said resetting wheel shaft, and a tripably supported controller arm arranged to be engaged by said carriage and by which said resetting wheel shaft is held from rotation pending the engagement of said carriage with said arm.

23. The combination in the registering mechanism of a calculating machine, of numeral wheels, transmission wheels for operating said numeral wheels, and means whereby said transmission wheels may be connected in multiple.

24. The combination in the registering mechanism of a calculating machine, of numeral wheels, transmission wheels for operating said numeral wheels, and a connecting screw set in one of said transmission wheels whereby the transmission wheels adjacent thereto may be connected to the wheel in which the screw is seated.

FERDINAND J. TILLMAN.

In presence of—
Wm. H. Scott,
E. M. Harrington.